No. 717,623. PATENTED JAN. 6, 1903.
C. C. & E. A. RIOTTE.
VALVE MECHANISM AND CONNECTED PARTS.
APPLICATION FILED APR. 15, 1901.
NO MODEL. 2 SHEETS—SHEET 1.
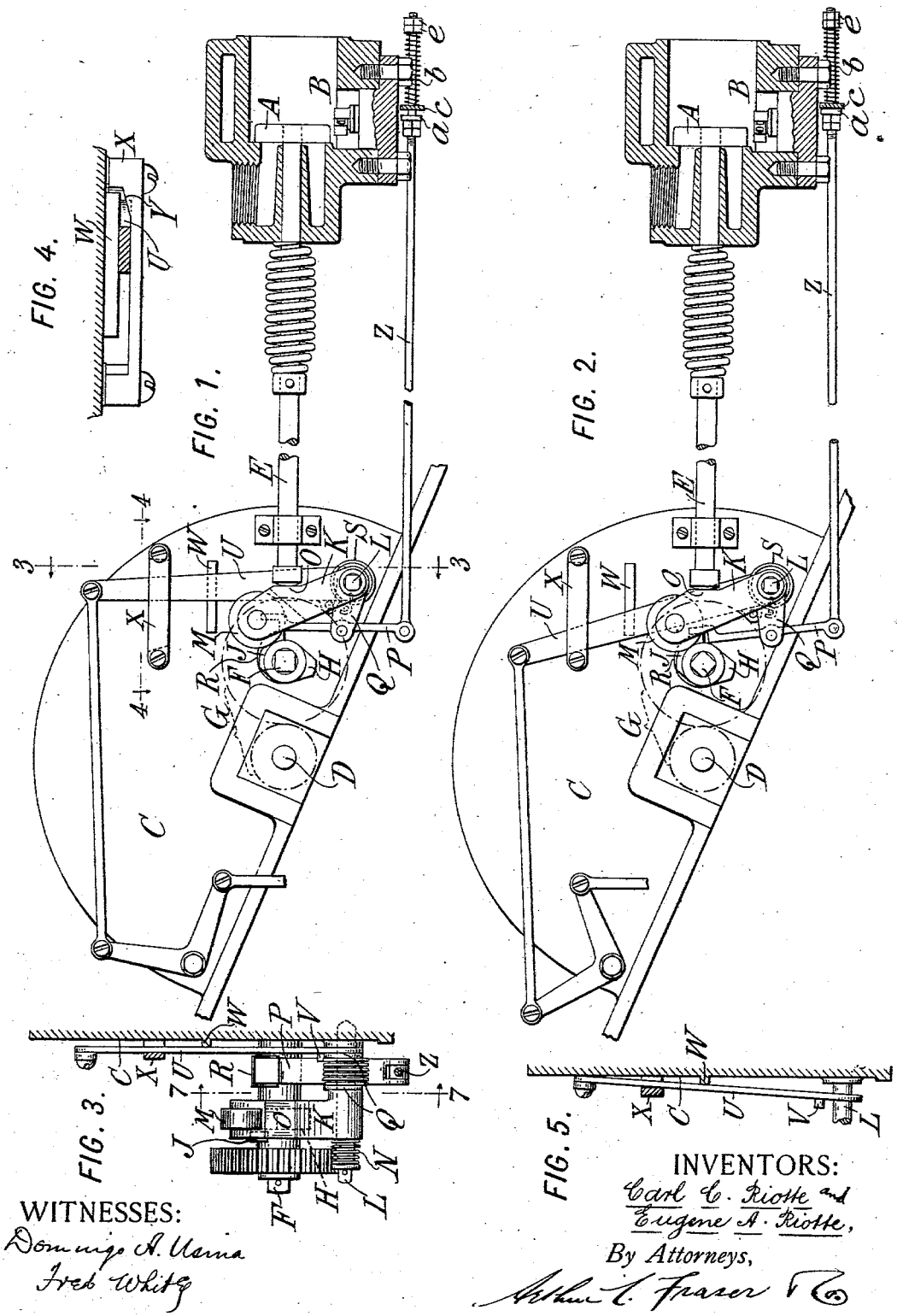
WITNESSES:
Domingo A. Usina
Fred White
INVENTORS:
Carl C. Riotte and
Eugene A. Riotte,
By Attorneys,
Arthur C. Fraser & Co.

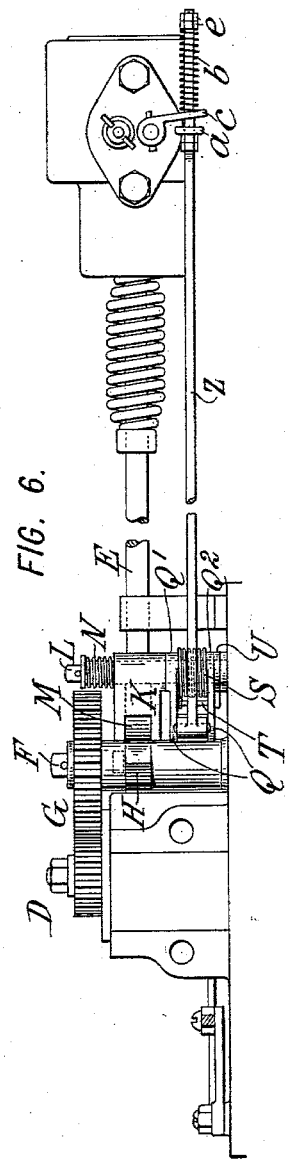
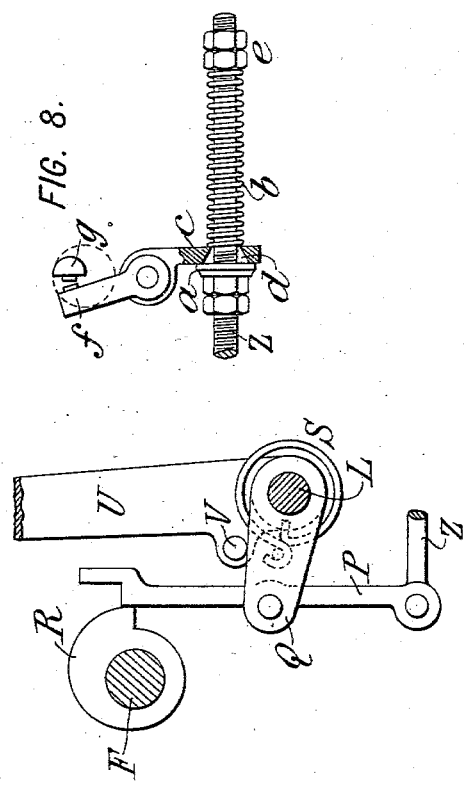
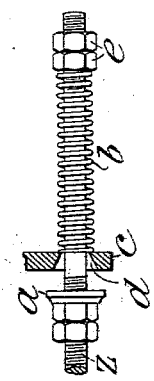
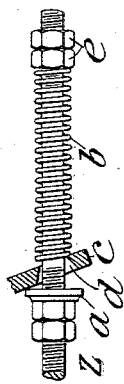

UNITED STATES PATENT OFFICE.

CARL C. RIOTTE AND EUGENE A. RIOTTE, OF NEW YORK, N. Y.

VALVE MECHANISM AND CONNECTED PARTS.

SPECIFICATION forming part of Letters Patent No. 717,623, dated January 6, 1903.

Application filed April 15, 1901. Serial No. 55,859. (No model.)

*To all whom it may concern:*

Be it known that we, CARL C. RIOTTE and EUGENE A. RIOTTE, citizens of the United States, and residents of the borough of Manhattan, city, county, and State of New York, have jointly invented certain new and useful Improvements in Valve Mechanisms and Connected Parts, of which the following is a specification.

Our invention aims to provide certain improvements in and connected with valve mechanisms, and especially in connection with relief and igniter mechanisms for explosion-engines, which are simple in construction and operation and which in combination are designed to give accurate control of the operation of such an engine.

Our invention provides also various improvements in the direction of simplifying the construction and rendering more certain the operation in detail of such an engine.

Our invention provides also certain other improvements in detail, which will be set forth in the following specification.

Referring to the accompanying drawings, which illustrate one embodiment of our invention, Figure 1 is a side elevation of the crank-chamber, relief-valve, ignition-chamber, and connected parts. Fig. 2 is a similar view showing the parts in another position of adjustment. Fig. 3 is a section approximately on the line 3 3 of Fig. 1. Fig. 4 is a section on the line 4 4 of Fig. 1. Fig. 5 is a sectional view similar to Fig. 3, showing certain parts in a different position. Fig. 6 is an under side view of Fig. 1. Fig. 7 is a section on the line 7 7 of Fig. 3 on an enlarged scale. Fig. 8 is a detail of the connection between the igniter rod and arm. Figs. 9 and 10 are details of the same connection, showing the parts in certain positions which they assume in operation.

Referring to the drawings, A is the relief-valve, and B the ignition-chamber, of any suitable type of explosion-engines.

C is a portion of the crank-chamber, and D is the crank-shaft. These parts are such as are well known in this type of engines, it being explained, however, that, as shown, they are designed for a horizontal engine instead of the usual vertical engine. The relief-valve is provided with the usual rod E. It is usual in engines of this type to operate the relief-valve from a cam-shaft making one revolution for every two revolutions of the crank-shaft—such, for example, as the cam-shaft F, connected by any suitable gearing G to the crank-shaft D and having thereon a cam H, which operates the valve A to exhaust from the cylinder at each second revolution. It is found to be very difficult to start the engine, however, unless means are provided for relieving the pressure at each revolution, and it is common to employ means for varying the period of operation of the valve from once every second revolution of the engine to once every revolution. Our invention provides a mechanism for accomplishing this purpose which is very simple and which is especially well adapted to connection with the igniter-adjusting mechanism, as hereinafter explained. For this purpose we employ a separate cam J on the shaft F, which is at one side of the cam H, as shown in Fig. 3, and which serves as a secondary relief under the conditions stated. For transmitting movement from the cam H or the cams H and J to the valve-rod E we preferably provide an arm K, which is pivoted on a stud L or other suitable bearing and has at its free end a roller M, the position of the arm K being normally such as to bring the roller M in the path of the regular exhaust-cam H, but not within that of the relief-cam J. In order to interpose the arm K between the relief-cam J and the valve-rod E, we provide means for moving it along the stud L against the action of the spring N, which holds it in its normal position on said stud. The rod E bears on the face O of the operating-arm K in all positions of such arm. The means for producing the desired lateral movement of the arm K are described hereinafter. It is advisable in engines of this type that when running at high speed the ignition should take place a short time before the crank reaches the dead-center; but as the speed is reduced it is necessary to retard the instant of ignition with relation to the position of the piston, so that the ignition approaches more closely the point of dead-center, and for very slow speeds comes after the crank passes the dead-center. The adjustment for this purpose must be very nice in order to avoid kicking back by the engine. Our improved mechanism includes a very efficient means for accomplishing this adjustment very gradually and accurately, in which an igniter-operating lever is provided, which is operated by a cam, the relative positions of the lever and cam being adjustable in a direction tangential to the cam, so as to vary the time of operation of the igniter with any desired degree of niceness, the variation being gradual and being directly proportional to the movement of the lever.

The igniter-operating lever is shown at P, being fulcrumed, as shown, on a supporting-arm Q and arranged with its upper end in the path of a cam R. (Shown best in Fig. 7.) This igniter-operating cam is preferably mounted on the shaft F, which carries the valve-operating cams H and J, but at one side thereof, as shown in Fig. 3. The supporting-arm Q of the lever is preferably arranged on the stud L, being pivoted thereon and being pushed in the forward direction of movement of the cam R—that is to say, upwardly in the present case—by a spring S, fixed to and surrounding the shaft. In its preferred construction the arm Q consists of a pair of side members $Q'$ and $Q^2$, Fig. 6, which carry the lever P between them and which also are connected by means of a pin T, under which the free end of the spring S engages, as shown best in Figs. 1 and 7. The spring S is conveniently carried between the two side members $Q'$ and $Q^2$. For giving the lever P the desired backward or downward adjustment we preferably use a lever U, pivoted on the stud L and bearing on the arm Q, as by means of a laterally-projecting pin V, which overhangs the upper edge of the arm Q. The lever U is connected by any suitable mechanism, such as the links and levers shown, with a primary operating means, which may be hand-operated or otherwise. For advancing the point of ignition the lever U is thrown to the left, its extreme position being shown in Fig. 2. By this movement the pin V, bearing on the arm Q, throws the lever P down, so that when the cam R is in the same position as in Fig. 1 the ignition has already been effected.

Since it is when the engine is running slowest that the ignition should be delayed to the latest point and at the same time the relief-cam should be thrown into operation, we arrange for the carrying out of these two operations simultaneously—that is to say, our mechanism is so arranged that as the ignition approaches its latest point, indicating a very slow speed of the engine, the arm K is thrown into position to bring the roller M into engagement with the relief-cam J. For this purpose we may provide a fulcrum-point about which the lever U may move in a direction angularly to that in which it moves in adjusting the ignition-point, and we may also provide for a movement of the lever U about such fulcrum-point during the last operation of its movement to retard the igniter. In the form shown the fulcrum-point is constituted by a lug W. (See Figs. 4 and 5.) The upper end of the lever U is held against the lug W by a guide X, attached to the frame in any suitable way. The inner face of the guide is parallel with the face of the lug W for the greater portion of its length, but at one end is inclined, as shown at Y, so that as the lever U is pushed over to this end of the guide the upper end of the lever is thrown inward, and the fulcrum-point W being held stationary the lower end is thrown out along the stud L, which results in a lateral movement of the arm K to bring the same into position to transmit the motion of the relief-cam J to the valve-rod. At the same time by the movement of the lever longitudinally of its guide X the igniter is adjusted as explained.

Especially adapted to coöperate with the igniter-operating lever P is the form of connection which we employ between the igniter-arm and the igniter-operating mechanism. The lever P is connected to a rod Z, which is so connected to the igniter-arm as to hold the upper end of the lever P against the cam. The connection referred to comprises a pair of stops $a$ and $b$, between which the igniter-arm $c$ is held. Preferably the rod Z is passed through a flaring opening $d$ in the igniter-arm. One of the stops $a\ b$ is arranged to yield so as to permit a movement of the rod Z through the arm $c$ and a change in the angle of the rod and arm, as shown in Figs. 9 and 10. Preferably the stop $a$ is unyielding and the stop $b$ is yielding, consisting of a spiral spring on the rod Z and normally under compression, its pressure being adjusted by a nut $e$. By reason of the tendency of the two stops to hold the igniter-arm at a fixed angle with respect to the rod and by reason of the substantial fixity in direction of the rod the igniter-arm tends always to return to a determined position. Consequently the rod and the lever P are held in a fixed position, Fig. 8, intermediate of the extreme positions of its movement, Figs. 9 and 10. The pressure of the spring $b$ is alone sufficient to return the rod to such a position after it has been moved therefrom. With this construction the rod may be made very light, so as to be easily moved by the spring and so as to operate with a minimum amount of shock. By arranging the yielding stop $b$ at the outer end of the rod the effect of the cam is to produce a spring-pressure of the two contacts $f$ and $g$ when the rod is pulled to the left to the position shown in Fig. 9. As soon as the pressure of the cam is released the action of the spring $b$ is to throw the points $f\ g$ apart with a sudden movement and a considerable distance, the arm $c$ swinging to the position of Fig. 10, thus forming the spark. From this widely-separated position the spring $b$ again acts to return the parts to the normal position of Fig. 8.

It will be seen that we have provided an improvement which can be variously and advantageously availed of and which may be considerably varied in its details and in the arrangement of the various parts. It will be understood, therefore, that we do not limit ourselves to the specific embodiments of our invention shown and described, but desire to include all modifications which embody substantially the features of novelty set forth.

By the method of supporting the igniter-operating lever P the quick and accurate adjustment of the igniter is made possible, so as to avoid kicking back, and even if such adjustment be not made for any reason and the engine should kick back the cam R would bear down on the end of the lever J without damage, the spring S yielding to permit the lever to be pushed down until the cam passes it and afterward automatically restoring it to position.

What we claim, therefore, and desire to secure by Letters Patent, is—

1. In an explosion-engine of the type described having a relief-valve and an igniter, the combination of a lever, mechanism controlled by movement of said lever in one direction for adjusting the time of operation of the igniter relatively to the piston, mechanism controlled by movement of said lever at an angle to said first movement for varying the period of operation of the relief-valve, and means for giving said lever said two movements simultaneously.

2. In an explosion-engine of the type described having a relief-valve and an igniter, the combination of a lever, mechanism controlled by movement of said lever in one direction for adjusting the time of operation of the igniter relatively to the piston, mechanism controlled by movement of said lever at an angle to said first movement for varying the period of operation of the relief-valve, and means for giving said lever the movement to operate said relief mechanism during the last portion of its movement to retard said igniter.

3. The combination with an igniter-operating lever and a cam for operating said lever, of an arm Q connected to said lever and mounted on a stud, a spring for moving said arm Q yieldingly forward, a lever U bearing on said arm to move the same positively backward, an exhaust-valve, a valve-rod, a relief-cam J, an arm K, and means for interposing said arm K between said relief-cam and valve-rod by the movement of said lever U in a direction to permit said arm Q to move forward.

4. The combination with an igniter-operating lever and a cam for operating said lever, of a spring for moving said lever yieldingly forward, and an adjusting member bearing on said lever to move it positively backward.

5. The combination with an igniter-operating lever and a cam for operating said lever, of a stud, an arm Q connected to said lever and mounted on said stud, a spring for moving said arm Q yieldingly in a forward direction, and a lever U bearing on said arm to move the same positively backward.

6. In an explosion-engine of the type described having a relief-valve and an igniter, the combination of a lever, mechanism controlled by movement of said lever in one direction for adjusting the time of operation of the igniter relatively to the piston, and mechanism controlled by movement of said lever at an angle to said first movement for varying the period of operation of the relief-valve.

In witness whereof we have hereunto signed our names in the presence of two subscribing witnesses.

CARL C. RIOTTE.
EUGENE A. RIOTTE.

Witnesses:
FRED WHITE,
THOMAS F. WALLACE.